Aug. 9, 1938.　　　R. A. LIGHT ET AL　　　2,126,198
AUTOMATIC LUBRICATOR
Filed July 18, 1936　　　5 Sheets-Sheet 4
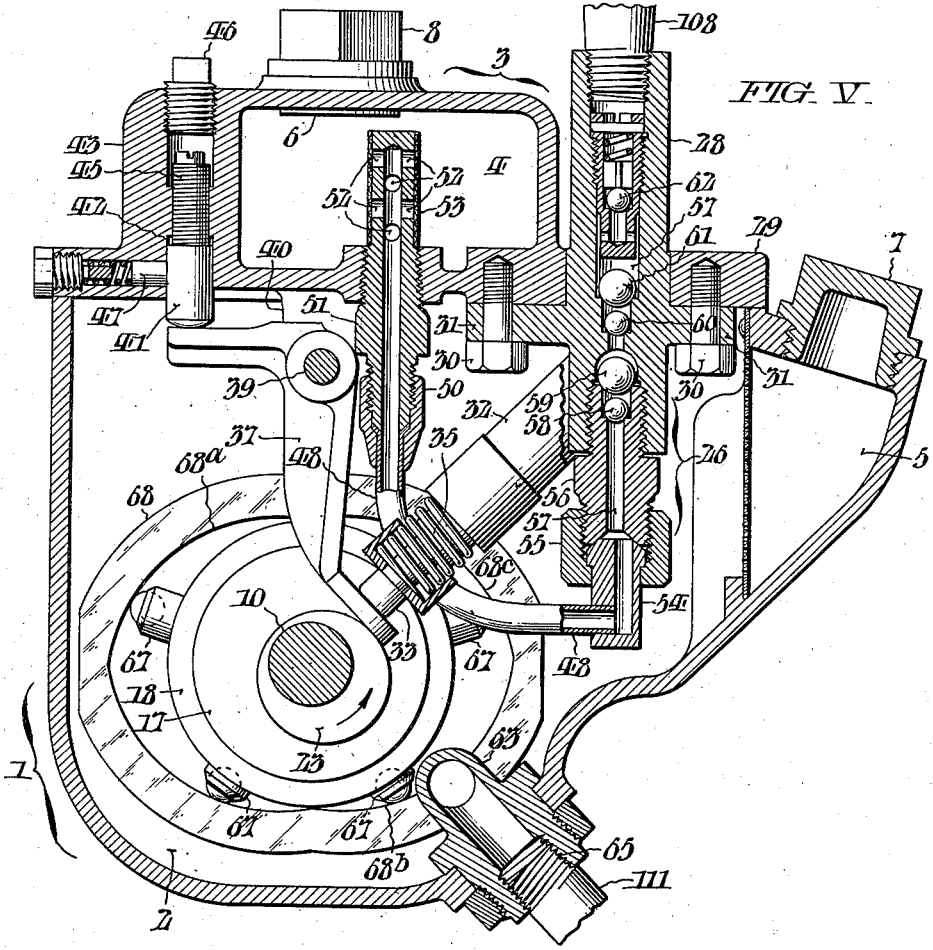
FIG. V.
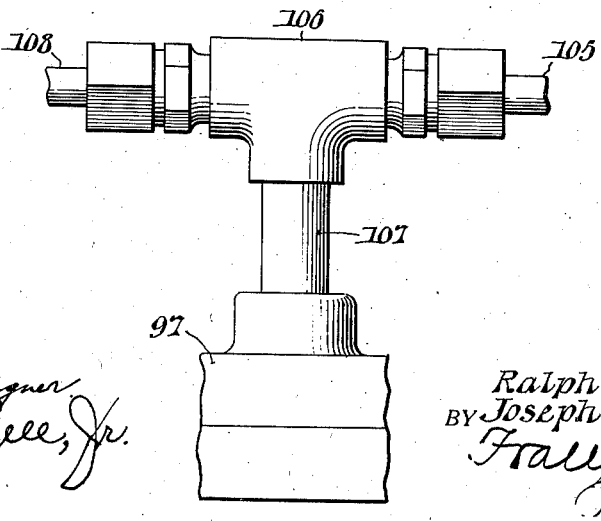
FIG. IX.
WITNESSES:
INVENTORS:
Ralph A. Light &
BY Joseph W. Price, Jr.
ATTORNEYS.

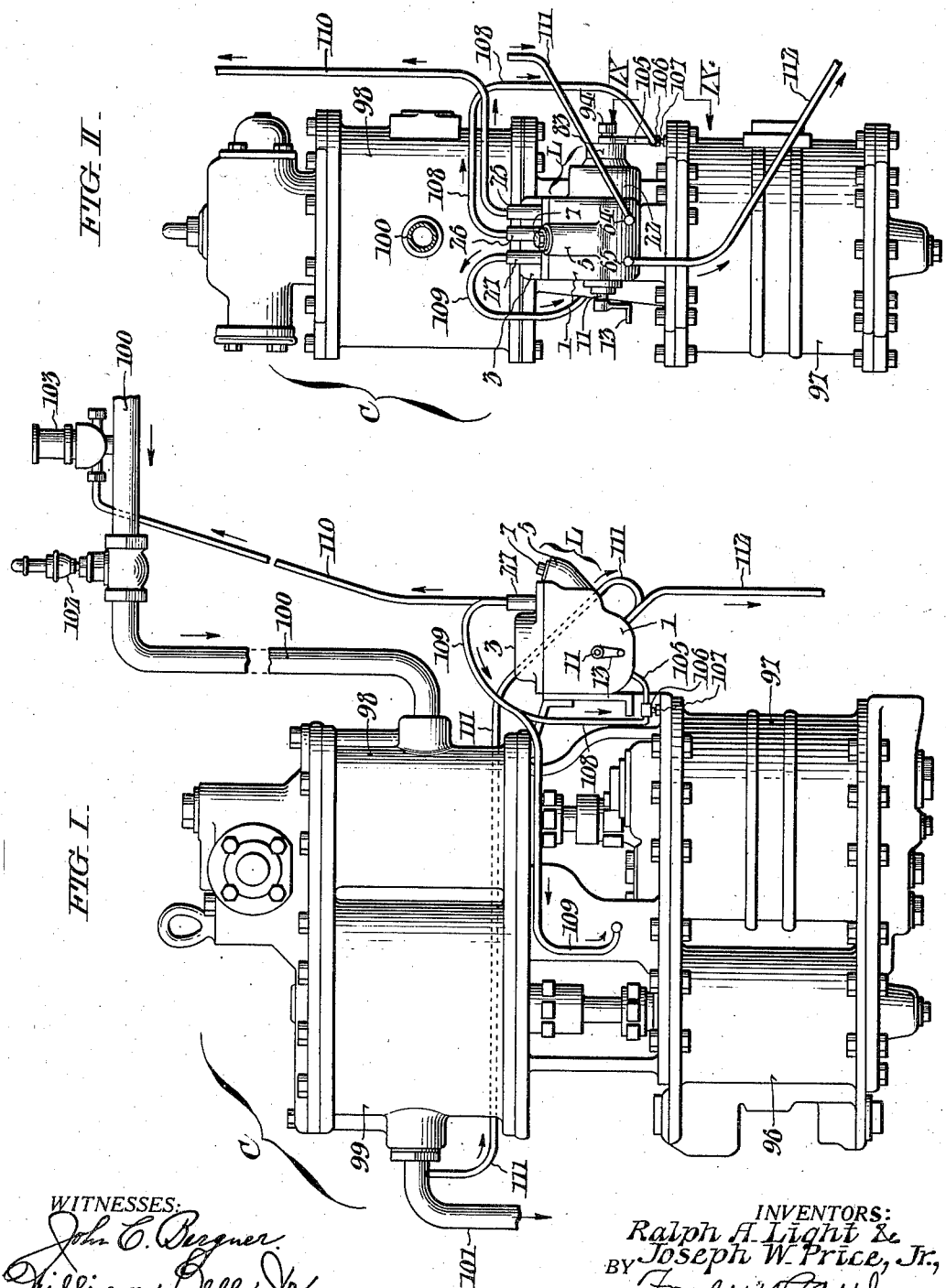

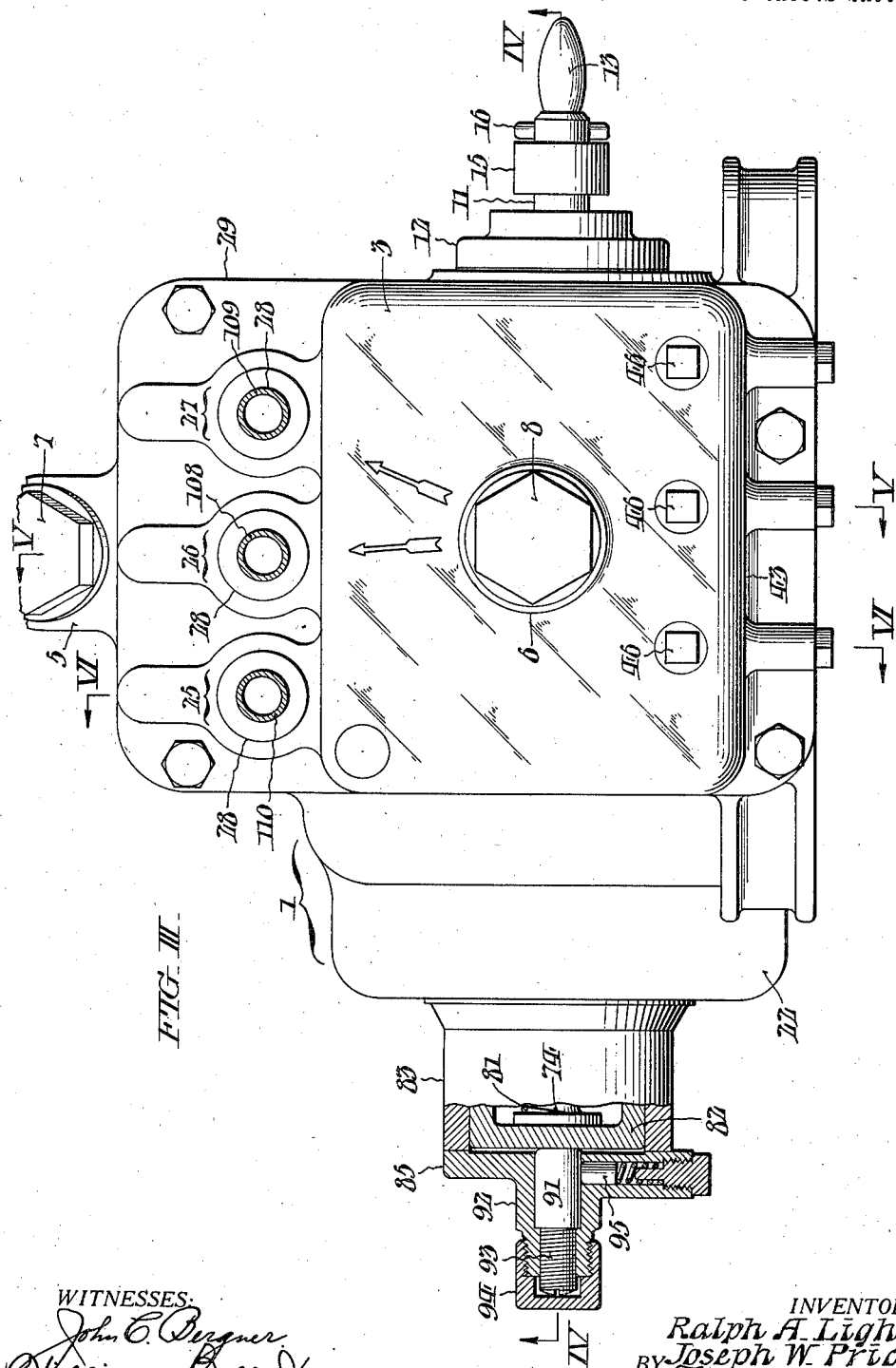

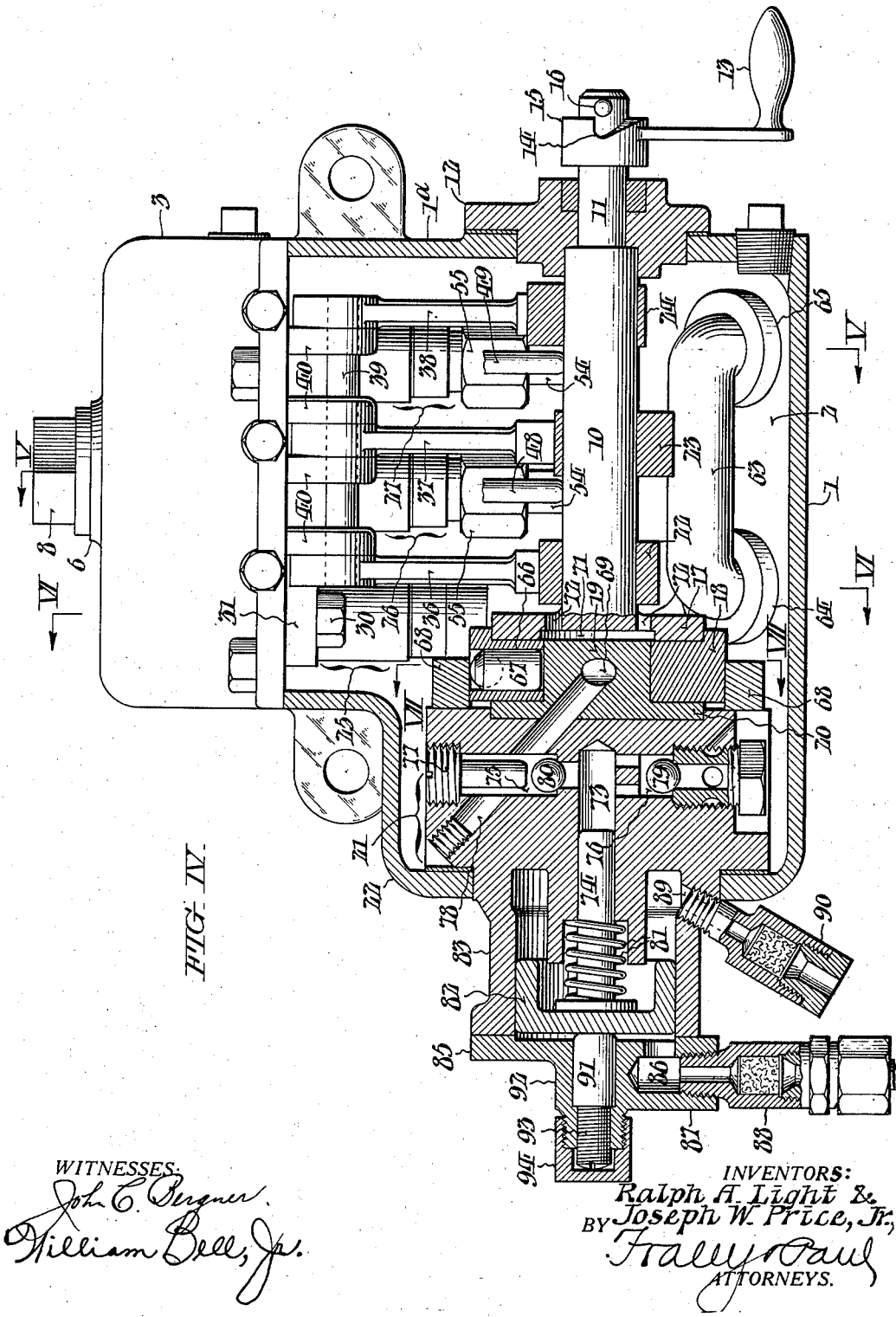

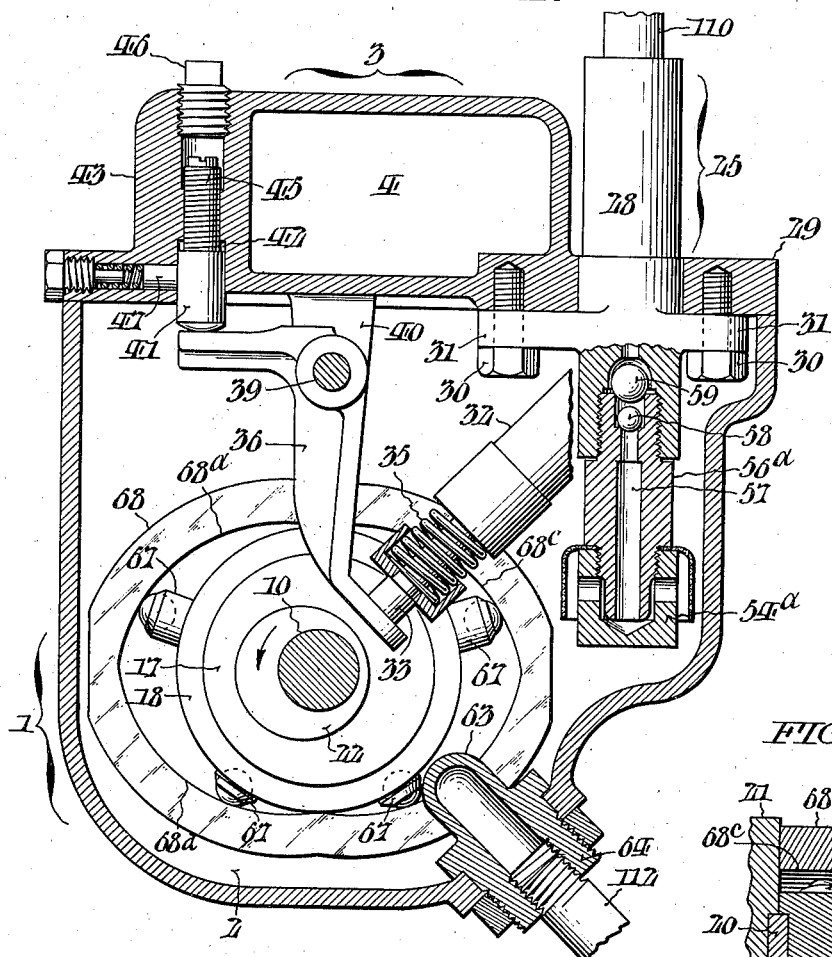
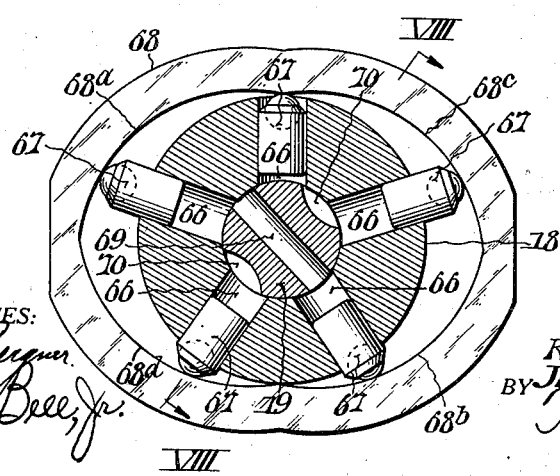
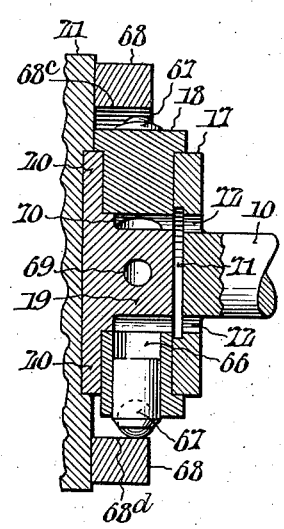

Patented Aug. 9, 1938

2,126,198

UNITED STATES PATENT OFFICE 2,126,198

AUTOMATIC LUBRICATOR

Ralph A. Light, Cynwyd, and Joseph W. Price, Jr., Philadelphia, Pa., assignors to The United States Metallic Packing Company, Philadelphia, Pa., a corporation of Pennsylvania Application July 18, 1936, Serial No. 91,348

2 Claims. (Cl. 184—29)

This invention relates to devices known as "lubricators" and designed for the purpose of automatically supplying lubricating oil in definite quantities to moving parts of machines.

An object of our invention is to provide a device of the kind referred to which is simple in construction, reliable in operation, and capable of supplying different kinds or grades of oil to different moving parts of machines where this is essential to the proper and efficient operation of such parts. The lubricator of our invention is thus advantageous, for example, with steam actuated compressors for train air brake systems where it is important or desirable that one kind of oil be employed for the steam cylinders, and another kind for the air cylinders.

Another object of our invention is to utilize oil from within a storage reservoir of the lubricator as the medium for operating a hydraulic motor from which one or more separately adjustable pump units are motivated to deliver the oil in predeterminable quantities from the lubricator through separate pipe or tube connections.

Another object of our invention is to provide a lubricator operative upon the above principle wherein a piston pump actuated by pressure fluid from an extraneous source (for example by air from an air compressor such as hereinbefore referred to with which the lubricator is being used), serves as a means for periodically forcing oil into the hydraulic actuating motor of the device to effect intermittent operation of said motor.

Our invention is also directed toward the provision of means whereby the stroke of the piston of the pump controlling the motor can be regulated to vary the speed of the latter and thereby correspondingly effect oil delivery from the several oil pumping units of the lubricator irrespective of their individual adjustment.

Other objects and attendant advantages will appear from the detailed description of the accompanying drawings.

Fig. I shows in front elevation a steam actuated air compressor, and a lubricator in association therewith embodying the present improvements.

Fig. II is an end elevation of the organization viewed from the right of Fig. I.

Fig. III is a plan view of the lubricator drawn to a larger scale and with a portion thereof broken away and shown in section to expose important details which would otherwise be hidden.

Fig. IV is a view of the lubricator partly in vertical longitudinal section, taken as indicated by the arrows IV—IV in Fig. III, and partly in elevation.

Fig. V is a cross sectional view taken as indicated by the arrows V—V in Figs. III and IV.

Fig. VI is a cross sectional view taken as indicated by the arrows VI—VI in Figs. III and IV.

Fig. VII is a detail sectional view taken as indicated by the arrows VII—VII in Fig. IV, and showing the hydraulic motor by which the lubricator is actuated.

Fig. VIII is a detail sectional view taken as indicated by the arrows VIII—VIII in Fig. VII; and, Fig. IX is a fragmentary detail view taken as indicated by the arrows IX—IX in Fig. II.

Referring first to Figs. III—IX of these illustrations, our improved lubricator comprises a casing with a lower section 1 which constitutes a reservoir 2 for one kind or grade of lubricating oil; and a hollow upper section 3 which serves as a reservoir 4 for another kind or grade of oil. The reservoirs 2 and 4 are separately accessible for filling through openings 5 and 6 which are respectively protected by removable screw plugs 7 and 8. Extending longitudinally of the lubricator is a shaft 10 whereof one end is reduced as at 11 and projects through an inset bearing 12, in a wall 1a of the lower casing section 1, to the exterior for attachment of a hand crank 13. This hand crank 13 normally hangs free, but is provided with side notches 14 in its boss 15 capable of being engaged with the ends of a transverse pin 16 through said shaft when it is shifted axially outward on the latter. The notches 14, it will be observed, have sloping approaches, so that upon being released, the crank 13 automatically disengages itself from the pin 16. At its opposite or inner end, the shaft 10 has a circular co-axial disk-like head 17 whereto is suitably secured a concentric annulus 18 which constitutes the rotor of a pneumatically-controlled hydraulic driving motor hereinafter more fully described. As shown, the annulus 18 is rotatably supported by an axial projection 19 of a plate 20 recessed into the adjacent end face of a stationary block 21 within an offset 22 of the lower casing section 1. Mounted upon the shaft 10 within the casing are three eccentric cams 22, 23, 24 which are uniformly spaced angularly on said shaft and which serve to actuate three generally similar oil delivery pump units designated 25, 26, 27 respectively. Each of these pump units 25—27 has a vertical cylindrical body such as shown at 28 in Figs. V and VI whereof the upper end projects through a lateral flange 29 of the top casing section 3, and which is secured by headed screw bolts 30 passing through lateral ears 31 on such unit and threadedly engaging tapped holes in the bottom of said top casing section. In a plane radial to the shaft 10, each pump unit 25—27 is formed with a cylinder such as shown at 32 in Figs. V and VI wherein operates a plunger 33 which is urged outward by a spring 35. Interposed between the outer ends of the plungers 33 of the several oil pumping units 25—27 and the actuating cams 22—24 on the shaft 10 are the flat end portions on pendant arms of bell crank levers 36, 37, 38 respectively, which levers are independently rockable on a shaft 39 supported in suspension by bearing ears 40 on the upper casing section 3. The swing of the bell crank levers 36—38 can be variously limited to regulate the amount of oil delivered by the corresponding oil pump units 25—27 through adjustable means, whereof one is shown in each of Figs. V and VI. Each such means comprises a stop abutment 41 in the path of the horizontal arm of the corresponding bell crank lever 36—38, said abutment being in the form of a plug engaged in the bottom end of a vertical hole 42 in the side wall 43 of the upper casing section 3, and backed by a set screw 45 which is adjustable in said opening and accessible upon removal of a screw plug 46. Each stop 41 is frictionally held in position by a spring pressed friction shoe 47 which engages it from one side as shown in Figs. V and VI. By virtue of this arrangement, it will be apparent that the bell crank levers 36—38 can be individually set to variously limit the movements imparted to the oil pump plungers 33 by the rotary cams 22—24 and thereby predetermine the amount of oil pumped by the respective units 25—27.

In the present instance, the units 26, 27 are used to pump oil from the upper reservoir 3 by way of connecting tubes 48 and 49, see Figs. IV and V. One end of each of the tubes 48, 49 is coupled by a union 50 (Fig. V) with a tubular fitting 51 screwed upwardly into the bottom of the upper casing section 3, said fitting being closed at the top. The upper portion of the fitting 51 within the reservoir 4 has oil inlet apertures 52 at different levels, and is surrounded by a filter screen or strainer 53. The other end of each of the tubes 48, 49 connects laterally into a terminal piece 54 which is secured by a gland nut 55 to a nipple 56 (Figs. IV and V) screwed axially into the bottom end of the body 28 of the corresponding pump units 26 and 27. The terminal piece 54, it will be noted, is closed at the bottom and has an upward passage 57 in communication with the axial flow passage 57 within the body of the pumping units 26 and 27. During the suction strokes of the plungers 33 in the pumping units 26, 27 definite quantities of oil are drawn from the upper reservoir 4 into the bodies 28 of such units past ball check valves such as shown at 58, 59 in Figs. IV and V; and during the pressure strokes of said plungers, the oil charges thus drawn into the passages 57 are displaced upwardly past ball check valves such as indicated at 60, 61 and 62. The pump unit 25 on the other hand draws oil from the lower reservoir 2, through the appended tubular extension 56a at the bottom of its body 28 which has a terminal piece 54a with an umbrella screen open directly into said reservoir as shown in Fig. VI.

The oil in the lubricator may be heated by passing steam through a radiator 63 within the lower section 1, whereof the inlet 64 and outlet 65 pass through the bottom of the casing and are provided with internal threads as indicated for connection of piping as more fully explained later.

Disposed within uniformly spaced radial bores 66 of the drive rotor annulus 18 on the shaft 10 are plunger pistons 67 with ball ends adapted to cooperate with the internal surface of a ring cam 68 which surrounds said rotor and which is fixed to the block 21. As shown in Figs. IV and VII the axial boss 19 of the plate 20 is provided with a diagonally disposed diametral passage 69 by way of which oil taken from the lower reservoir 2 is forced, as presently explained, under pressure into the inner ends of substantially aligned pairs of the radial bores 66 of the annulus 18 during rotation of the latter. As a consequence, the plunger pistons 67 of successive pairs of the substantially aligned bores 66 are urged outwardly, and, through coaction of their ball ends with the diametrically opposite curved cam portions 68a, 68b of the ring 68, the shaft 10 is rotated counterclockwise in Figs. V and VI. As the piston plungers 67 pass the ends of the diametral passage 69 and encounter the diametrically opposite curved portions 68c, 68d of the cam ring 68, they are forced inwardly incident to which the oil is permitted to escape from the corresponding bores 66 by way of diametrically aligned circumferential ports 70 in the boss 19 of the plate 20 (see Fig. VII), said ports lying at right angles to the passage 69 and communicating with an axial cavity 71 common to a number of circumferentially spaced drain holes 72 in the disk head 17 of the shaft 10 whereby the oil is returned to the reservoir 2.

Operative in an axial bore 73 (Figs. III and IV) of the block 21 is an oil displacing plunger 74. As shown the bore 73 communicates with the upper and lower valve chambers 75, 76 in a vertical passage through the block 21, of which chambers the former is closed at the top by a removable screw plug 77 and communicates by way of an inclined connecting passage 78 with the diametral passage 69 in the boss 19 of the plate 20. During the suction strokes of the plunger 74 (leftward in Fig. IV), oil is drawn from the reservoir 2 past a ball check valve 79 into the chamber 76; and during the opposite or pressure strokes of said plunger, the sucked-in charge of oil is forced past a ball check valve 80 into the upper valve chamber 75, and from thence is conducted by way of the passages 78 and 69 to the radial bores 66 of the rotor 18. The plunger 74 is subject to a helical compression spring 81 whereby it is maintained in contact with a piston 82 disposed in a cylinder afforded by a protruding portion 83 of the block 21. The outer end of the cylinder 83 is closed by a head 85 having a port 86 which leads laterally into said cylinder, and a tapped boss 87 for connection of a filter nipple 88 which provides for connection of piping from a source of pulsating air. As the compressed air enters the cylinder 83 through the port 86, it urges the piston 82 forward (rightward in Fig. IV) so that a charge of oil previously drawn from the reservoir 2 by the plunger 74 past the ball check valve 79 into the block 21 is discharged past the ball check valve 80 to actuate the hydraulic rotor 18. During the pressure strokes of the piston 82, the air displaced behind it is permitted to escape through a release port 89 at the bottom of the cylinder 83 into which a filter nipple 90 is screwed. Thus, by successive actuations of the piston 82 under the influence of pulsating air, the shaft 10 is progressively rotated and the oil pump units 25—27 successively actuated during each rotation of the shaft 10. In order that the stroke of the piston 82 may be varied, there is provided an adjustable plug stop 91 which occupies the bore of an axial boss 92 of the cylinder head 85, said stop being shiftable by means of a set screw 93 whereof the slotted outer end is covered by a removable screw cap 94. A laterally engaging spring pressed friction shoe 95 (Fig. III) serves to prevent accidental shifting of the stop 91. Obviously increase or decrease in the movement allowed the piston 82 will correspondingly effect the rate of rotation of the shaft 10 and in turn increase or decrease the oil deliveries from all the pump units 25—27 of the lubricator.

In Figs. I and II, we have shown our improved lubricator at L in association with a steam driven compresser, comprehensively designated C, of a train air brake system. The illustrated compressor C is of the two stage compression or compound type having high and low pressure air cylinders 96 and 97, and actuating high and low pressure steam cylinders 98 and 99. Steam is conducted to the high pressure cylinder 98 of the compressor through a pipe 100 and exhausted from the low pressure cylinder by way of a pipe 101. Interposed in the steam supply pipe 100 is a governor 102 and a diaphragm terminal check valve 103, which may be of any approved standard construction. The compressed air for actuating the piston 82 in the cylinder 83 of the lubricator L is supplied from the compressor C through a pipe 105 (see Figs. II and IX). As shown in Fig. IX, the air pipe 105 is coupled by a T fitting 106 to the top of a short vertical pipe 107 which connects into the low pressure cylinder 97 of the compressor C. Another pipe 108 coupled with the other extremity of the T 106, leads from the oil pumping unit 26 of the lubricator L as shown in Figs. I and II, and conducts oil from the top reservoir 4 of said lubricator to the low pressure air cylinder 97 of the compressor C. Through still another pipe 109 oil is conducted from the upper reservoir 4 of the lubricator L into the high pressure air cylinder 96 of the compressor C by action of the oil pumping unit 27. By means of a tube 110, the oil pump unit 25 of the lubricator L is connected with the diphragm terminal check valve 103 for conduction of oil from the lower reservoir 2 of said lubricator to lubricate the steam cylinders 98 and 99 of the compressor C. Steam for heating the oil in the lubricator L is taken from the steam exhaust pipe 101 of the compressor C and conducted through a tube 111 to the intake 64 of the radiator 63 in the lower reservoir 2 and finally discharged through an exhaust tube 112 leading from the outlet 65 of said radiator.

From the foregoing, it will be seen that the lubricator of our invention is capable of automatically supplying different kinds or grades of lubricating oil in definite pre-determinable quantities to the air and steam cylinders of an air compressor. It is to be understood, however, that our invention is not limited to such application alone, since it may be employed with equal advantages to supply different kinds of oil to other forms of machinery or apparatus. It is also to be understood that the number of different reservoirs may be increased or decreased as well as the number of individual pumping units associated with the lubricator as may be desired or required to suit the exigencies of specific cases of application.

Having thus described our invention, we claim:

1. In an automatic lubricator, the combination of a casing having a reservoir for oil, pump means for drawing oil from the reservoir for delivery to the parts to be lubricated. a shaft from which the pump means is actuated, a hydraulic motor for rotating the shaft operated by oil supplied thereto under pressure, an air motor for pumping oil from the reservoir for actuating said hydraulic pump, and means whereby the speed of the hydraulic motor is regulated by the length of the stroke of the piston in the air motor.

2. In an automatic lubricator, the combination of a casing having a reservoir for oil, multiple pump units for drawing oil from said reservoir for delivery to the parts requiring lubrication, a shaft common to and by which all the multiple pump units are actuated, a hydraulic motor for rotating the shaft actuated by oil delivered thereto under pressure, an air motor for pumping oil from the reservoir for actuating said hydraulic pump, and means for varying the length of the stroke of the air motor piston whereby the speed of the hydraulic motor is regulated and in turn the rate of oil discharge from all of the pump units aforesaid.

RALPH A. LIGHT.
JOSEPH W. PRICE, Jr.